July 23, 1957  A. J. HILLER  2,800,610
SONAR PULSE FREQUENCY INDICATOR, ETC
Original Filed June 5, 1950  3 Sheets-Sheet 2
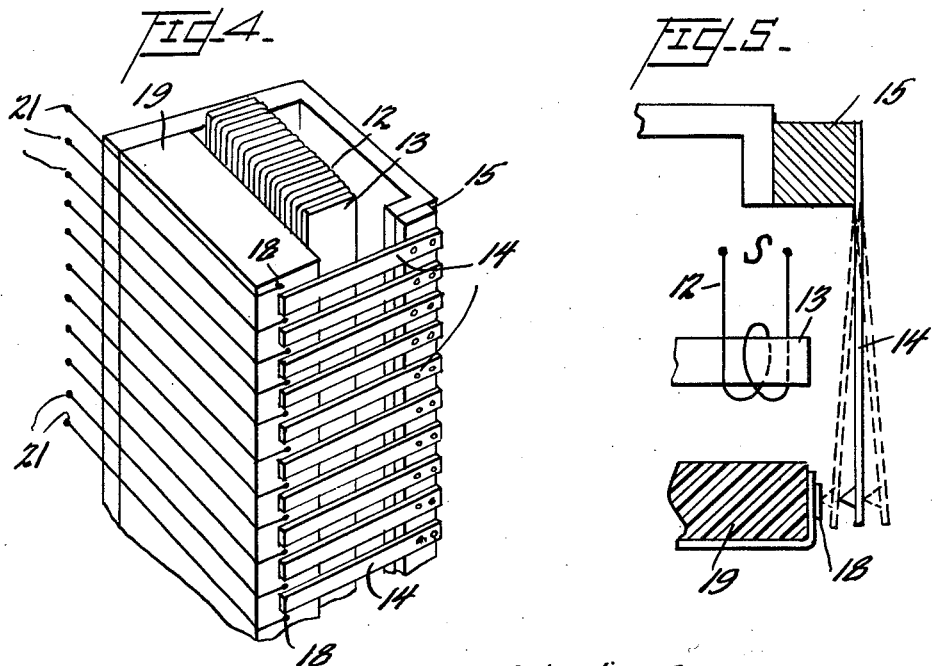
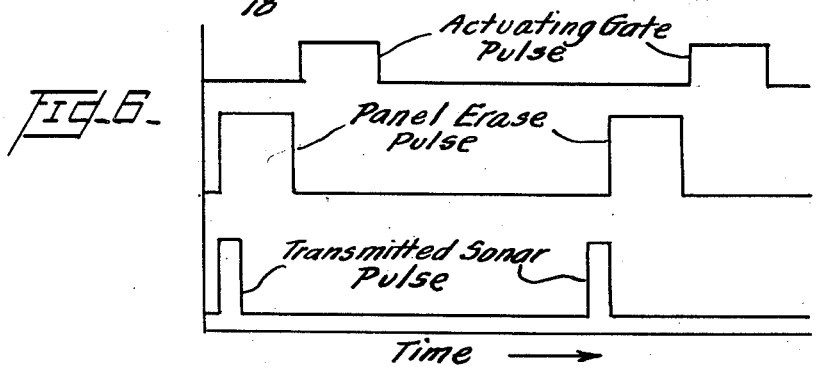
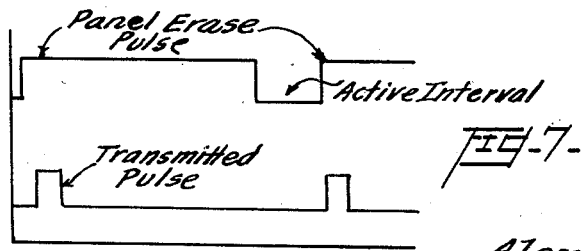
INVENTOR
Alexander J. Hiller,
BY
ATTORNEYS

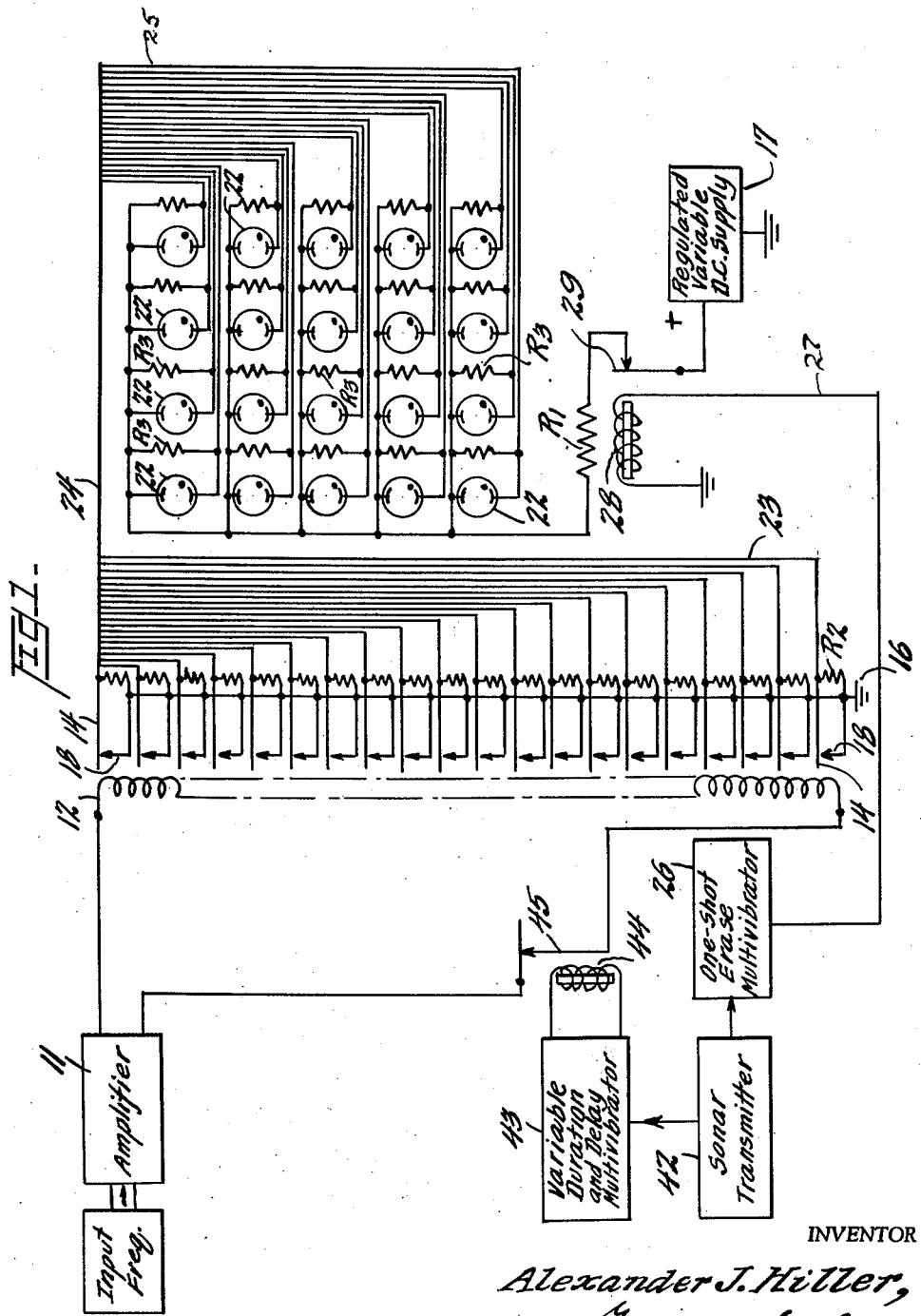

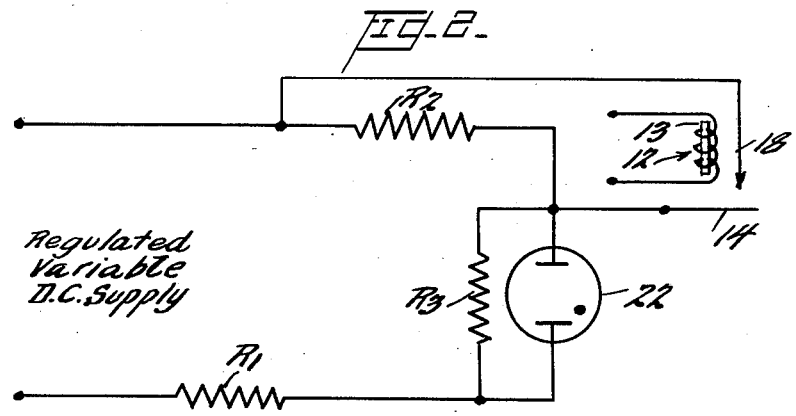
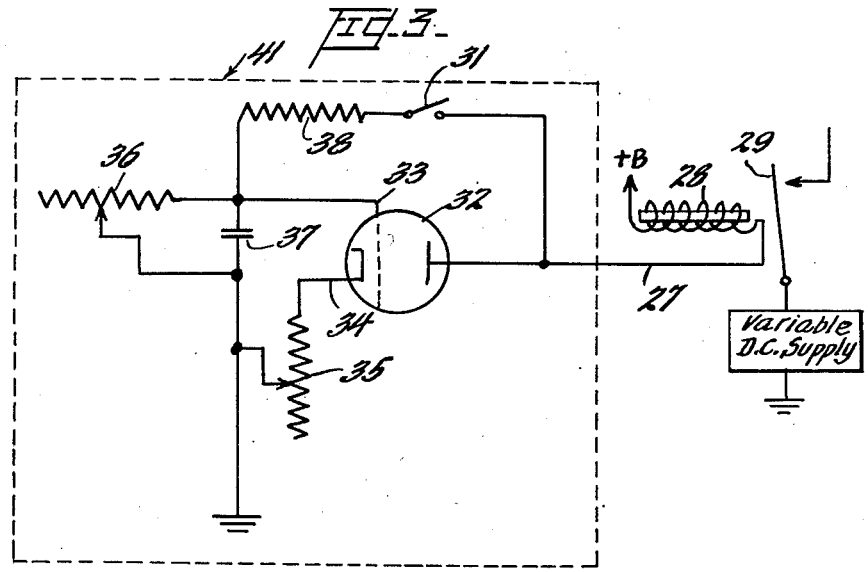
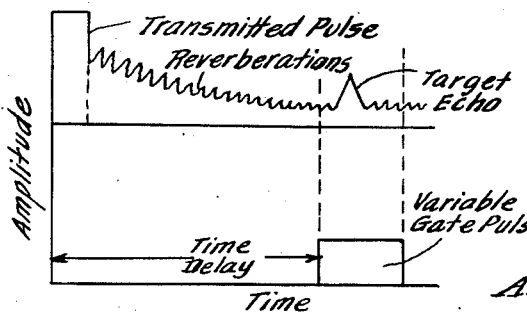

United States Patent Office 2,800,610
Patented July 23, 1957

2,800,610

SONAR PULSE FREQUENCY INDICATOR, ETC.

Alexander J. Hiller, Bladensburg, Md.

Original application June 5, 1950, Serial No. 166,182, now Patent No. 2,684,471, dated July 20, 1954. Divided and this application July 1, 1952, Serial No. 299,929

4 Claims. (Cl. 315—103)

(Granted under Title 35, U. S. Code (1952), sec. 266)

The invention described herein may be manufactured and used by or for the Government of the United States of America for governmental purposes without the payment of any royalties thereon or therefor.

This application is a division of application Serial No. 166,182, filed June 5, 1950, for Sonar Pulse Frequency Indicator, etc., now Patent No. 2,684,471, granted July 20, 1954.

The present invention relates to frequency measuring and indicating apparatus and more particularly to display means for frequency detection in a transient signal, the display means registering any detected frequency until erased.

Various apparatus has been proposed and used for measuring components of frequency in mechanical and electrical systems. Among these are systems employing a series of vibrating reeds having graduated resonant frequencies uniformly spaced throughout a band of frequencies embracing an unknown frequency, and in mechanical systems one or more of said reeds having resonant frequency approximating that of the vibration examined are caused to vibrate sufficiently to permit visual observation thereof. In electrical systems, the mechanical vibration is replaced, in some cases, by a magnetic coil operating equally on all reeds of the system to produce a resonant vibration of a particular reed having a natural frequency approximating that of the signal of the electrical signal passing through the coil. In prior application of this type of frequency measurement and analysis the detection of a particular frequency depends upon the observation of a reed vibration rendered abnormally large by virtue of resonance. A serious objection to all such systems is evident in the necessity to constantly watch every elemental reed in the device representing a frequency band investigated, a requirement which is impossible for a large number of reeds. A second serious disadvantage lies in the shortness of the duration of vibration of the particular reed when the incoming signal is of short duration, thereby causing either insufficient vibration of the reed for purposes of observation, or a vibration of such short duration as to escape observation entirely.

The present invention provides means for detecting and registering vibrations regardless of the shortness of duration thereof, such that pulsed signals displaying information coded in frequency may be analyzed and the component frequency thereof registered even though of highly transient electrical nature. The invention will hereinafter be described in connection with sonar Doppler effects and measurement of velocity of approach between transmitting-receiving and signal reflecting objects. It will be evident, however, that the same system may be employed to great advantage in the measurement of other types of relative motion between objects by means of Doppler effect observed in a known frequency signal transmitted from one to the other. The system is likewise of value in the analysis and registration of frequency components in any transient or other electrical signal. Mechanical vibrations may also, in most cases, be converted to electrical signals by means of crystals, magnetic deflection devices, and the like, and these electrical signals analyzed by means of the present invention for the purpose of determining and registering predominant frequency components therein.

It is accordingly an object of the present invention to provide means for measuring and registering unknown frequencies of transient nature for which apparatus has not previously been available.

Another object is the provision of new and improved means of registering a detected frequency.

A further object is the provision of an automatic circuit for measuring Doppler effects in a transmitting and receiving system.

A still further object is the provision of an automatic circuit for determining the range rate between vessels, at least one of which is employing sonar apparatus.

A still further object is the provision of new and improved means for displaying target closing rates and of automatic gating and erasing circuits therefor.

A final object is the provision of adjustable means in a sonar system under the control of an operator or retaining a visual indication of Doppler frequencies in received signals and erasing said indications at will.

Other objects and many of the attendant advantages of this invention will be readily appreciated as the same becomes better understood by reference to the following detailed description taken in connection with the accompanying drawings, wherein like reference numerals designate like parts throughout and wherein:

Fig. 1 is a schematic diagram of a system adapted to sonar employing the present invention for registration until erased of frequency components of the signal input thereto;

Fig. 2 is an electrical diagram of one display element of the system of Fig. 1 showing the the manner of operation;

Fig. 3 is a diagram of an operator-controlled circuit for erasing the indications displayed on the panel of Fig. 1;

Fig. 4 is a perspective view of a portion of a suitable vibrating reed device having added thereto fixed contacts each arranged for vibratory contact with one of the reeds of the assembly;

Fig. 5 is a partial plan view, partly in section, of one of the reed elements of Fig. 4 including, schematically, an operating coil therefor, and a cooperating contact member;

Fig. 6 is a time diagram showing the sequence of operations in the system of Fig. 1;

Fig. 7 is a time diagram of an alternative system employing the manual erase circuit of Fig. 3; and Fig. 8 is a diagram showing the relationship of the gating pulse to the transmitted pulse, reverberations and target echo.

Referring now to the drawings and particularly to Fig. 1 thereof, 11 indicates an amplifier preferably of very high gain for supplying sufficient power to actuating coil 12, which couples with the magnetic material comprising, or attached to, the vibrating reeds of a frequency indicating device, for use in sonar sysems wherein the desired information relates to the Doppler shift in frequency between an outgoing sonar pulse and the returned signal. The amplifier 11 contains input terminals connected to the sonar receiver output and preferably further contains filter or detector means for eliminating all portions of said output except the band of frequencies within which the Doppler effects may be found. For some purposes the amplifier 11 includes own-Doppler nullifier means, to cause the resultant amplifier output to include only the Doppler representing target rate of approach. This ODN is optional, and not always desirable. The actuating coil 12 normally comprises a magnetic core 13 extending throughout the length of the vibrating reed device, this core being surrounded by a coil of sufficiently low impedance to permit passage of electrical signals within the expected frequency range, for example, 500 to 1500 cycles per second. The core material 13 may be transformer iron, or material of low magnetic retentivity, such as "Permalloy," in order that the hysteresis effects will be minimized.

As shown in Fig. 4, the coil 12 engages all reeds 14 of the vibrating reed device. The reed shanks adjacent the core 13 are of ferrous material or have similar magnetic material attached thereto in order to provide attraction between the core 13 and the reed 14 when the coil 12 is energized at the input frequency thereto. The reeds 14 are conveniently attached, in commercially available apparatus, to a common bar 15 which provides support therefor and a common connection therebetween. The common connection is shown in Fig. 1 which may conveniently be grounded as at 16 or connected to one side of the voltage supply 17 of the system, as desired. The coil 12 may, if desired, comprise an individual electromagnet for each of the reeds 14, the individual electromagnets being in series or in parallel, and connected to the output of the amplifier 11. In the system of Fig. 1, the vibrating reeds 14 are shown diagrammatically adjacent the coil 12 in normally open relationship with fixed contacts 18, the operation of any reed 14 and its contact 18 being such that the energization of the coil 12 is insufficient to close the contact 18 except when the frequency of energization approximately coincides with the natural resonant frequency of the particular reed 14. At frequencies where resonance does not occur, this reed 14 normally vibrates only a fraction of the distance necessary to make contact with contact 18. In commercially available devices, the number of elements 14 is variable and the frequency interval between successive reeds of the device is constant, but may be manufactured to any desired specification. The fixed contacts 18 are conveniently secured to a common insulating block 19 at a spacing equal to the spacing of the reeds 14, the block 19 being secured to the same base as the coil 12 and the support bar 15. Leads 21 connecting, respectively, with contacts 18, are employed for connecting to the registering device in the present invention.

In that portion of the device already described, various reeds 14 will vibrate in accordance with electrical frequencies impressed on coil 12. The resonant movement of the reeds 14 may be observed, visually, as in prior devices, when this movement persists for a sufficiently long time. In a sonar system where the incoming signal is of duration considerably less than one second, the reed vibration is initiated during that short interval and dies away so rapidly that an observer may fail completely to note the existence of such vibration, regardless of the care with which the reed device is observed. It may also be noted that a large number of reeds are required in the system where a wide frequency band and several frequencies simultaneously may be encountered, and where an accurate observation of frequency is desired. For example, the Doppler frequency may be desired to an accuracy of 10 cycles per second, and 100 reeds or more may be required to cover the range 500 to 1500 cycles. The impossibility of the human observer detecting and noting down transient vibrations on each one of these many elements is quite apparent, and presents a major difficulty in the detection of Doppler frequencies.

To solve this difficulty, the present invention provides a panel of indicator lamps 22, preferably of the glow-discharge lamp type, each connected as indicated in Fig. 2 to a regulated voltage supply and to one of the reeds 14. The lamps 22 are preferably arranged in a rectangular panel and each provided with an index number thereabove or therebelow indicating the frequency at which the corresponding reed vibrates in resonance with the Doppler signal. The columns of the panel arrangement may conveniently represent the respective decades of frequency within the range, such that the first column covers frequencies from 500 to 600 and the second column from 600 to 700, etc., or may be arranged in any other convenient manner. The regulated voltage supply 17 is preferably made variable for adjustment to optimum operating conditions for the lamps 22. A single series resistance $R_1$ is connected between the voltage supply 17 and the lamps 22. A second resistance $R_2$, individual to each lamp, is in series with resistance $R_1$ and each lamp 22. A normally open circuit is connected in parallel with the resistance $R_2$ and comprises the reed 14 and the fixed contact 18. Each such resistance $R_2$ and parallel circuit associated therewith is individual to each lamp 22; and all such combinations of the panel are connected in parallel through $R_1$ to the voltage supply. A third resistance $R_3$ is connected in parallel across lamp 22 in each instance.

The actuating circuit for each lamp 22 is identical and includes series resistance $R_1$, series resistance $R_2$ and parallel resistance $R_3$. The regulated voltage supply is impressed across these three resistances when contact 18 is open. The portion of the voltage impressed across $R_3$ is insufficient to initiate electrical discharge in the glow lamp 22, the relative values of the resistance being so chosen that a voltage exists across $R_3$ slightly less than sufficient to initiate discharge. The voltage impressed across $R_2$ is normally of smaller value but constitutes an appreciable fraction of the supply voltage such that when the contact 18 is closed and $R_2$ is partially shorted thereby, the resulting voltage across $R_3$ is sufficient to initiate discharge in the lamp. The characteristic behavior of the glow lamp is that a smaller voltage is required to maintain discharge within the lamp than is necessary for initiation thereof. Consequently, when the vibration of reed 14 terminates upon cessation of the input signal and normal voltage is restored across $R_2$, the lamp 22 continues to discharge until the voltage supply is interrupted. The resistance $R_1$ serves as ballast to prevent excessive current in lamp 22 and to stabilize the circuit.

The indicating and registering circuit operates in the following manner: Positive voltage, after regulation and adjustment thereof, is impressed from supply 17, through contacts 29 to resistance $R_1$, and thence to one side of all tubes 22 in parallel, each tube 22 being in parallel with a resistance $R_3$. The other side of each tube 22 has a lead 25 to cable 24 and a corresponding lead 23 to a corresponding reed 14, whence it is grounded through fixed contact 18 when reed 14 is sufficiently actuated by coil 12. The resistance $R_2$, across the gap between reed 14 and contact 18, normally takes a substantial portion of the voltage 17, such that intermittent shorting thereof at contact 18 raises the voltage across tube 22 and $R_3$ to the initial discharge potential, conduction then beginning in tube 22. As voltage is re-established on $R_2$ by opening of contact at 18 the voltage across tube 22 is lowered, but not sufficiently to extinguish the tube until voltage is removed therefrom by opening contacts 29. Actuation of each reed 14 is under control of the alternating current frequency from amplifier 11 whenever contacts 45 are closed by relay 44, when the gating pulse is used. Otherwise the reeds are continuously under influence of the amplifier output and the unresponsive condition is established at the tubes 22 by opening of contacts 29 for such intervals as desired.

In accordance with the foregoing description of the indicating device, it is seen that each lamp 22 will be lighted whenever the reed 14 is caused to vibrate sufficiently to make contact with its fixed contact 18. Moreover, duration of the vibration is of no importance, since the lamp, once lighted, remains in the discharging condition until voltage is removed therefrom. Each lamp, therefore, serves as a visible indicator for a reed 14 and provides a memory feature such that the panel registers and retains a record of resonant vibration detected by any of the frequency detecting reeds 14. In the diagram of the system shown in Fig. 1, the leads 23 from reeds 14 and resistance $R_2$ are brought individually to a cable 24 and thence to a corresponding lead 25 connected to a lamp 22 associated with a particular reed 14, the individual conductors not being shown within the cable 24 but being insulated one from the other such that no common connection exists between the reeds 14 except by way of contacts 18.

When a signal corresponding to the resonant frequency of one of the reeds 14 has been received and an indication thereof registered on the corresponding lamp 22, it is desirable to have means for erasing the indication in order that a new determination of frequencies can be made. In a sonar system a large number of pulses may be sent out each minute and it may be frequently desirable to erase the registration of frequency at frequent intervals. In the sonar system of Fig. 1, this is conveniently done by means of a simple single shot multivibrator 26 having a suitable time constant and controlled by the transmitted signal. The multivibrator is arranged to produce a pulse of current of predetermined duration which pulse is transmitted by way of conductor 27 to relay 28 having thereon normally closed contacts 29 which are arranged in the circuit between the voltage supply 17 and resistance $R_1$. In accordance with this arrangement, a transmitted sonar pulse activates the multivibrator 26, which thereafter produces an operating pulse for the relay 28 to open the contacts 29 for an interval which is adjustable by adjustment of the time constant of the multivibrator. This adjustment is conveniently made by a knob-controlled rheostat. During the time that contacts 29 are open no voltage supply is available for tubes 22 and any tube which is indicating will be immediately extinguished.

It is preferred that the multivibrator 26 also include a delay interval after transmission of the pulse and before the erasure of the indication in order to allow time for a transmitted signal to be returned as an echo and indicated on the panel of lamps 22. This delay interval is adjustable, ordinarily, by the adjustment of a resistance according to well-known methods, to provide a manually variable interval for the reception of echoes. This interval is normally made long enough to assure that the operator will have seen and noted the frequency label adjacent to the actuated lamp. Where the erasure of the frequency registration is automatic, as in Fig. 1, this interval before erasure may be substantially the full lapse of time between transmitted pulses, terminating in each case prior to the activating gate pulse, as in Fig. 6.

In many purposes, it is convenient to have manual control of the erasure of the frequency indications as indicated in Fig. 3. The relay 28 controls normally closed contacts 29 and is actuated by manual switch 31 as follows: one side of the relay 28 connects to a voltage supply and the opposite side thereof connects to the vacuum tube 32, having a grid 33 and cathode 34 in which the cathode is grounded through resistance 35, which is conveniently made adjustable. The grid 33 connects to ground through variable resistance 36 across which is placed the condenser 37. The switch 31 connects the plate of tube 32 and the grid 33 through resistance 38. When the switch 31 is closed, the voltage of grid 33 is caused to rise to initiate conduction in tube 32 sufficient to actuate relay 28 and open contacts 29, whereby any tubes 22 then indicating will be extinguished. The manual control circuit just described is referred to generally by numeral 41 and may replace automatic control 26 being connected to relay 28 by conductor 27. When the control includes the condenser-resistor circuit shown, an automatic erase duration is provided by a simple keying operation.

When circuit 41 is employed in sonar Doppler indicating applications, it is convenient to leave any Doppler signals from amplifier 11 unerased for a considerable period of time. For example, if two vessels are approaching each other at a constant angle, the Doppler signal from amplifier 11 will be of constant frequency and will be indicated by the operation of one of the lamps 22 corresponding, for example, to 600 cycles. The operator of the sonar equipment notes the frequency indicated and determines therefrom the range rate or closing rate between the two vessels. As long as both vessels continue on the same course at the same speed no other lamp 22 is operated. However, the change of speed or direction of either vessel causes a change in the Doppler frequency and the consequent operation of one or more lamps 22 adjacent to the one already operated. A continuous change in range rate causes a progressive operation of the various lamps of the panel. For some purposes, it is desirable to retain the original rate indication in addition to each of the new indications, to provide a more complete picture of the past movements of the target vessel. The manual control circuit provides means for erasing these indications at any time desired.

The manual control circuit also provides means for inactivating the panel during any reverberation period following each transmitted signal. For this purpose, the switch 31 may be closed at or immediately before the occurrence of a transmitted pulse and the open contact 29 keeps the panel inactive until such time as the switch 31 is reopened. This is illustrated in Fig. 7 where the panel erase pulse extends from the time prior to the transmission of the pulse up to the approximate time when an echo should be returned, a new erase pulse being produced by closure of switch 31 prior to the next transmitted pulse, thereby leaving an adjusted active interval of duration barely sufficient to indicate the Doppler as the reflected pulse is received by the sonar equipment.

The active interval described in connection with Fig. 7 and the manual erase pulse may be provided automatically, as indicated in Fig. 1, wherein a keying pulse from the sonar transducer actuates multivibrator 26, the erased pulse beginning in that instance concomitantly with the transmitted pulse and extending through any desired interval. The sonar transmitter is indicated generally at 42 from which the keying pulse is transmitted to multivibrator 26 and to a second multivibrator 43. This multivibrator is generally similar to multivibrator 26 and has means controlling a delay prior to the emission therefrom of the voltage pulse. This delay interval is made variable ordinarily by a control knob operating a potentiometer to vary the time constant of one of the two multivibrator tubes. A second control knob similarly controls the duration of the voltage pulse. This voltage pulse is passed through a relay 44 which controls normally open contacts 45 whereby the coil 12 is actuatable only during the voltage pulse from multivibrator 43. A representative time of occurrence and duration for this type of pulse is indicated in Fig. 6 and comprises an actuating gate pulse. The duration of the actuating gate pulse is normally adjusted after a target has been located, and when it is desired to obtain the Doppler frequency indicating the closing rate of that target to the exclusion of other possible targets.

It is apparent that the elements of the lamp panel may be labeled or calibrated in closing rates, directly, where amplifier 11 does not include any own-Doppler compensation, or in rate of target approach where own-Doppler is compensated. Thus calibrated, the device provides automatic registration of target rate of approach or closing rate, with adjustable control of reverberation and exclusion, optionally, of targets at distances other than that of the target under observation. Fig. 8 illustrates the desirability of control of delay time for the gating pulse, to exclude targets whose range brings the echo within the delay time or beyond the active interval controlled by the duration of the gate pulse. Fig. 7 illustrates the active interval provided by a manually variable erase pulse to have a similar active interval.

It should be understood that the foregoing disclosure relates to preferred embodiments of the invention and that it is intended to cover all changes and modifications of the examples of the invention herein chosen for the purpose of the disclosure, which do not constitute departures from the spirit and scope of the invention as set forth in the appended claims.

I claim:

1. A glow-discharge lamp control circuit for registering a transient signal of the character described comprising, a regulated source of potential, a glow-discharge lamp connected at one terminal thereof to said source, a resistance in series with said lamp, a second resistance in parallel with said lamp, a third resistance in series with the first resistance and the potential source to complete said circuit, means transiently shorting the first resistance to initiate discharge in said lamp, and circuit interrupting means for automatically terminating said discharge after a predetermined time by interrupting said circuit, whereby shorting of said first resistance increases the potential across the lamp to initiate conduction, and whereby the potential across said second resistance and the lamp is sufficient to maintain discharge after said shorting of the first resistance has terminated.

2. A glow-discharge lamp control circuit comprising a branch having in uninterrupted series connection a first resistor, a glow-discharge lamp, and a second resistor, a third resistor in uninterrupted parallel connection with said lamp, a shorting circuit comprising a switch means; said shorting circuit being connected in parallel with said first resistor, relay means having openable and closable contacts, said contacts being connected in series with said branch.

3. A circuit as defined in claim 2 but further characterized by said switch means comprising a vibratory reed.

4. A glow-discharge lamp control circuit adapted for initiating a discharge in said lamp in response to each pulse of repetitious transient phenomena and for terminating said discharge after a predetermined time interval but before the next pulse, said circuit comprising a branch having in uninterrupted series connection a first resistor, a glow-discharge lamp, and a second resistor, a third resistor in uninterrupted parallel connection with said lamp, a shorting circuit comprising a pair of contacts, one of said contacts being a vibratory reed, said shorting circuit being connected in parallel with said first resistor, relay means having openable and closable contacts, said relay contacts being connected in series with said branch, and an adjustable operating circuit for operating said relay means for interrupting said circuit, said operating circuit comprising a capacitor-resistor timing circuit.

References Cited in the file of this patent

UNITED STATES PATENTS

| 1,937,389 | Langer | Nov. 28, 1933 |
| 2,526,853 | Demers | Oct. 24, 1950 |